No. 750,949. PATENTED FEB. 2, 1904.
W. A. DARROW, A. C. WOOD & J. R. ALLEN.
APPARATUS FOR USE IN THE MANUFACTURE OF ARTIFICIAL STONE, &c.
APPLICATION FILED JUNE 19, 1903.
NO MODEL.
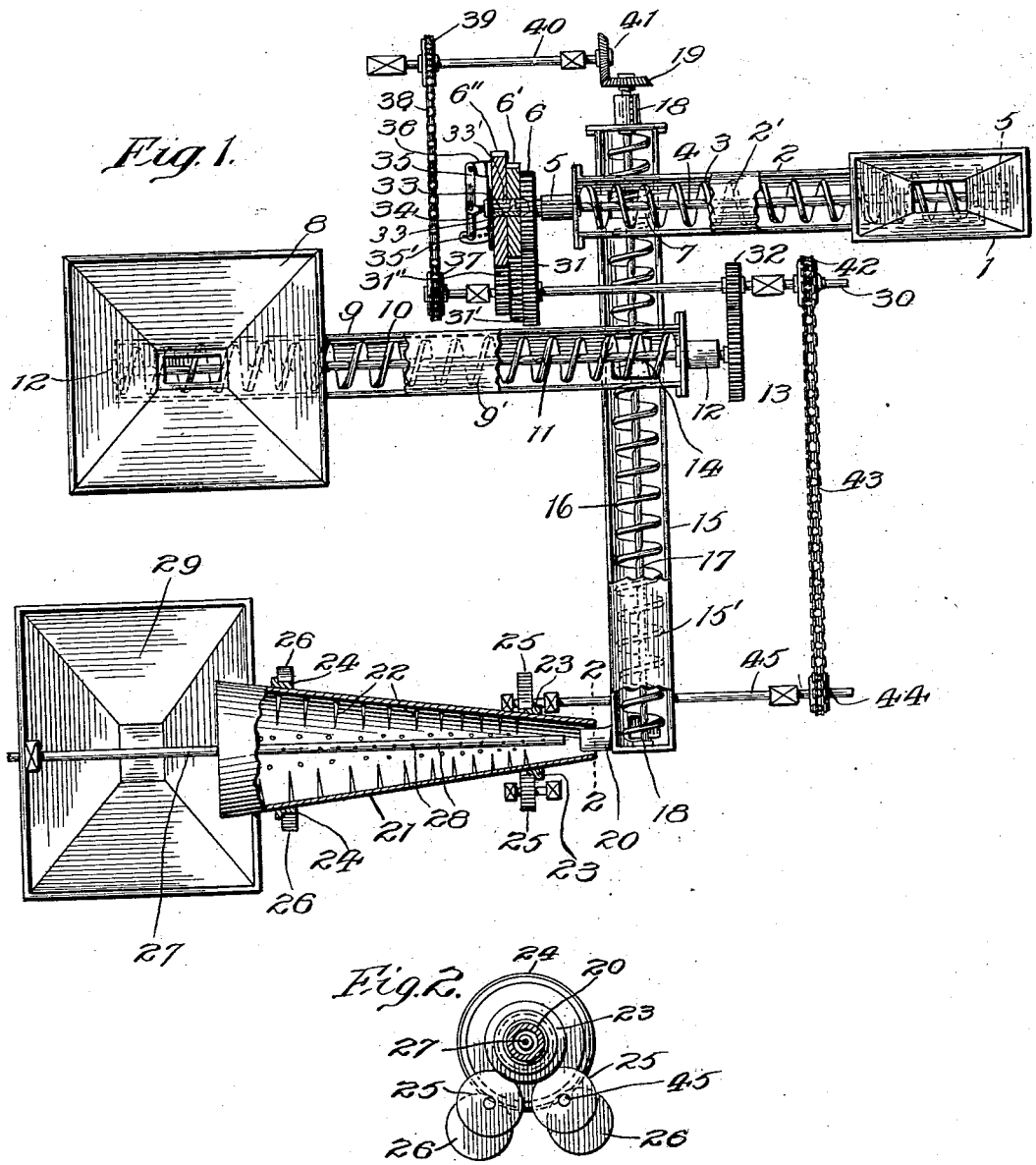
WITNESSES:
INVENTORS
W. A. Darrow, A. C. Wood and J. R. Allen
BY
ATTORNEY.

No. 750,949. Patented February 2, 1904.

UNITED STATES PATENT OFFICE.

WILLIAM A. DARROW AND ALBERT C. WOOD, OF PHILADELPHIA, PENNSYLVANIA, AND JOHN REX ALLEN, OF MERCHANTVILLE, NEW JERSEY.

APPARATUS FOR USE IN THE MANUFACTURE OF ARTIFICIAL STONE, &c.

SPECIFICATION forming part of Letters Patent No. 750,949, dated February 2, 1904.

Application filed June 19, 1903. Serial No. 162,221. (No model.)

*To all whom it may concern:*

Be it known that we, WILLIAM A. DARROW and ALBERT C. WOOD, of the city of Philadelphia, in the county of Philadelphia and State of Pennsylvania, and JOHN REX ALLEN, of Merchantville, in the county of Camden and State of New Jersey, have jointly invented certain Apparatus for Use in the Manufacture of Artificial Stones, Bricks, Mortar, and the Like, of which the following is a specification.

The primary purpose of our invention is to provide improved means for measuring, mixing, and steaming lime and sand or other materials for use in the manufacture of building-blocks. The mechanism is also well adapted for measuring and mixing lime and sand in the manufacture of mortar or for effecting an intimate mixture of definite proportions of granular materials generally.

The nature and characteristic features of the improvements will more fully appear by reference to the following description and the accompanying drawings in illustration thereof, of which—

Figure 1 represents a plan view of our invention, part being broken away for the purpose of illustration; and Fig. 2 represents a sectional elevation of the mixer and steamer, taken on the line 2 2 of Fig. 1.

As shown in the drawings, a hopper 1 is placed in position to feed material, as lime, into the trough or tube 2, having the cover 2′, the trough having therein a screw conveyer 3, whose shaft 4 is journaled in the bearings 5 and driven by one of the gear-wheels 6 6′ 6″, normally loose on the shaft and adapted to be fixed thereto, the material thereby conveyed through the tube being discharged therefrom through the aperture 7. A second hopper 8 is so placed as to feed material, as sand, into the trough or tube 9, having the cover 9′, the tube being provided with the screw conveyer 10, whose shaft 11 is journaled in the bearings 12 and has the driving gear-wheel 13 fixed thereon, by which material is carried through the tube and discharged through the aperture 14 thereof. A trough or tube 15, having a cover 15′ and a conveyer 16 in the tube, receives and mixes the materials discharged from the tubes 2 and 9, the conveyer having its shaft 17 journaled in the bearings 18 and being driven by the beveled gear-wheel 19, fixed thereon, by which the materials are carried through the trough 15 and discharged through the outlet-tube 20. A revolving conical mixer and steamer 21 is connected with the discharge-tube 20, which delivers into the mixer and steamer the materials discharged from the trough 15, the constantly downwardly inclined bottom of the mixer effecting the passage of the materials therethrough. The mixer is provided with the projections 22, extending inwardly to effect a more perfect mixture of the materials, and has the tires 23 and 24 thereon which roll upon the wheels 25 and 26 for supporting and revolving it. A steam-pipe 27 extends into the mixer, being placed axially therein, and has the perforations 28, through which jets of steam are discharged to wet and heat the materials during the operation of mixing them, thereafter the materials being delivered to the hopper or receptacle 29.

The several feeding and mixing devices of the apparatus coact in definite relation, bringing together, mixing, and discharging the desired quantities of the several materials through the following connecting parts: The driving-shaft 30, having thereon a nest of gear-wheels 31, 31′, and 31″, which mesh with the nest of gears 6, 6′, and 6″, and a gear-wheel 32, which meshes with the gear-wheel 13, causes the conveyers 3 and 10 to feed lime and sand in definite proportion into the mixing-tube 15. The several gears 6, 6′, and 6″, normally loose on the shaft 4, are separately fixed thereto by a movable key or spline 33, running in a longitudinal slot 4′ in the shaft, so as to be engageable successively with corresponding slots 33′ in the respective wheels, and having the swiveled connection 34 with the lever 35, the lever having one end fulcrumed at the point 35′ and the other end adapted to be fixed at various points upon the rack 36 to hold the key in engagement with the desired gear, by which the speed of the conveyer 3 may be varied with relation to the speed of the conveyer 10.

A sprocket-wheel 37, fixed on the shaft 30, is connected with and drives the sprocket-chain 38, which drives a sprocket-wheel 39, fixed on the revoluble shaft 40, the latter having thereon the beveled gear 41, which engages and drives the beveled gear 19 on the shaft 17. By these connections the conveyer 16 is revolved at a definite speed with relation to the speeds of the conveyers 3 and 10. A sprocket-wheel 42, fixed on the shaft 30, drives the sprocket-chain 43, which engages and drives a sprocket-wheel 44, fixed on a shaft 45, the latter being fixed to and revolving one of the wheels 25, whereby the mixing-shell 21 is revolved at a speed having a definite relation to that of the coacting parts.

Having described our invention, we claim—

1. The combination of a screw conveyer adapted for feeding lime at a definite rate, with a screw conveyer adapted for feeding sand at a definite rate, a screw conveyer adapted for receiving and mixing lime and sand discharged thereto by said first conveyers, and a revolving mixer having inwardly-projecting members for receiving the discharge from said last-named conveyers, substantially as specified.

2. The combination with a mixer and steamer of a screw conveyer having a journaled shaft with a gear-wheel thereon, a second screw conveyer having a journaled shaft with one or more gear-wheels thereon, a third screw conveyer having a journaled shaft with a gear-wheel thereon, said third conveyer directly receiving from said first two conveyers, and mechanism connecting the gear-wheels on the respective shafts whereby said conveyers revolve together at definitely-related speeds, substantially as specified.

3. The combination with a mixer and steamer of a screw conveyer, a second screw conveyer, a third screw conveyer to which said first and second conveyers directly discharge, and mechanism connecting said conveyers and revolving them together at definitely-related speeds, substantially as specified.

4. The combination of a conveyer, a second conveyer, a third conveyer to which said first and second conveyers directly deliver, a mixer to which said third conveyer delivers, and mechanism connecting said conveyers and mixer and revolving them together at definitely-related speeds, substantially as specified.

In testimony whereof we have hereunto set our hands, this 17th day of June, A. D. 1903, in the presence of the subscribing witnesses.

WILLIAM A. DARROW.
ALBERT C. WOOD.
JOHN REX ALLEN.

Witnesses:
BENSON MANN,
RUBY R. VALE.